United States Patent Office 3,287,990
Patented Nov. 29, 1966

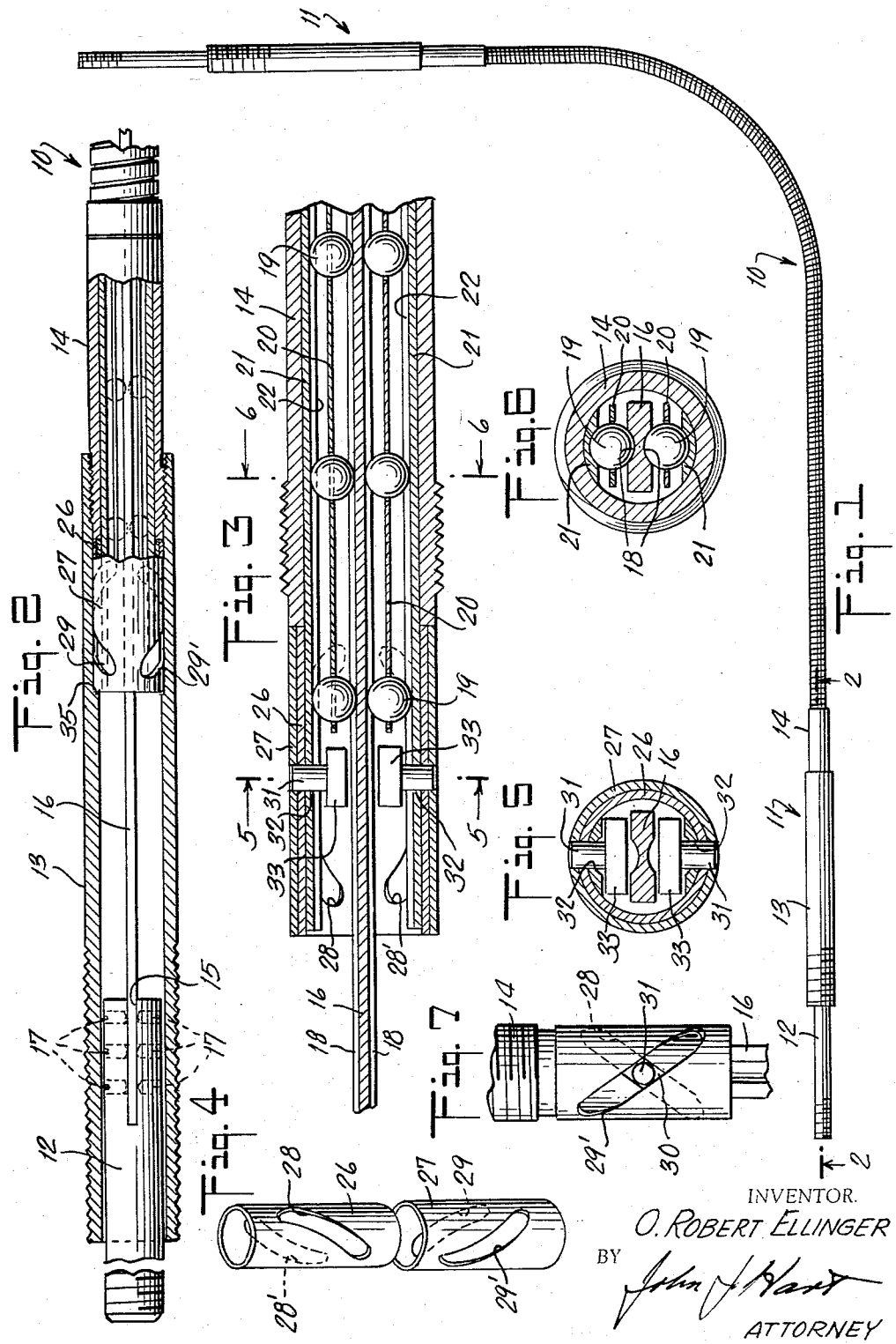

3,287,990
FLEXIBLE REMOTE CONTROL DEVICE
Oscar Robert Ellinger, Katonah, N.Y., assignor to Controlex Corporation of America, White Plains, N.Y., a corporation of New York
Filed Sept. 2, 1964, Ser. No. 396,793
8 Claims. (Cl. 74—501)

This invention relates to tubular flexible remote control devices of the push-pull type for transmitting traction and compressive forces to a controlled element situated at a distance from the operating part.

Control devices of the push-pull type are usually composed of a flexible tubular sheath along the axis of which is arranged a flat, force transmitting member slidable lengthwise of the sheath or tube to transmit the forces created at the operating part to the controlled element. The transmitting member is retained and guided in its movements by two rows of balls, similar to ball bearings, which are in engagement with longitudinal grooves or ball tracks provided in the two side faces of such member, and with longitudinal grooves or ball tracks provided in the opposed faces of two outer races, each extending in spaced, substantial parallelism with a side face of the transmitting member. The balls in each row thereof are usually maintained at given intervals by a ball cage which is constituted of a strip of metal that is located intermediate the transmitting member and one of the outer races, and is provided with spaced perforations to receive the balls.

It has been customary heretofore to anchor the two outer races at each end thereof to a longitudinally disposed sleeve-like anchoring member through the center of which freely extends the transmitting member. One of the outer races is attached by means of outwardly projecting lugs to the anchoring member so that there is practically no play therebetween, while the other outer race is slidably attached to such anchoring member to take care of the length differentials which occur as the control assembly is flexed through curves. The two anchoring members are are constructed both to guide the transmitting member in its longitudinal movements and to maintain the outer ends thereof properly spaced from the outer races. However, when the assembly is flexed in a curve at one end thereof, the curvature assumed by the transmitting member can cause it to come into binding relation with the associated anchoring member. This is caused in part by the fact that the provision of anchoring members of the type indicated necessitate that the ball cages terminate short of such anchoring members. As a result, the transmitting member or center race, at midstroke, is unsupported by the ball cages for one half its stroke beyond the outer ends of the anchoring members and for one quarter of its stroke adjacent to the inner ends of such anchoring members. This condition permits the transmitting member when the assembly is flexed, to deflect at each of these four places and thereby come into functional engagement with the anchoring members and to increase backlash. At the end of its stroke, the transmitting member is unsupported for the full length of the stroke adjacent to one end of the anchoring members, and for one half of the stroke adjacent to the outer end of the anchoring members, thus increasing these disadvantages of the aforesaid construction. These prior constructions also have the disadvantages that the bending of the control is restricted to one direction only and that the resulting reaction load created by such bending of the control is taken care of by only one of the outer races, namely, the outer race that is fixed at its ends to the two anchoring members.

It is the primary purpose of this invention to provide an improved flexible remote control device that does not have the aforesaid disadvantages of prior devices of this type.

One of the objects of the invention is to provide a construction which will enable the length differentials created by flexure of the device to be compensated for by each of the outer races, and thereby enable the control to be bent in two directions, thus facilitating the installation and actuation of the control.

Another object of the invention is to provide an improved control device which will deliver any reactionary load equally to each outer race and thereby reduce backlash during operation of the device.

A further object of the invention is to provide an improved control device in which the possibility of friction between the force transmitting member thereof and the anchoring members during flexure of the device will be reduced to a minimum.

Other objects of the invention as well as the features of novelty and advantages of the device thereof will appear from a perusal of the following description when read in connection with the accompanying drawings, in which FIG. 1 is an exterior view of a flexible remote control device embodying the invention;

FIG. 2 is a longitudinal sectional view taken along the line 2—2 of FIG. 1 and showing in an enlarged scale the interior construction of one end of the device;

FIG. 3 is an enlarged sectional view showing the construction and arrangement of the parts in the anchoring portion of such device end;

FIG. 4 is an exploded, perspective view of the two tubes to which one end of the outer races are connected;

FIG. 5 is a transverse sectional view taken along the line 5—5 of FIG. 3;

FIG. 6 is a view similar to FIG. 5, but taken along the line 6—6 of FIG. 3; and

FIG. 7 is an elevational view of the left hand end of FIG. 3.

In the drawing, the reference numeral 10 indicates generally the flexible sheath which encloses the body portion of the remote control device and which may be constituted of a spirally constructed metal tubular member as is usual in such devices. The sheath 10 is connected at its ends to the ends of the device which are generally designated in the drawings by the numerals 11, 11 and which are identical in construction. It will be observed from a comparison of FIGS. 1–3, that each device end 11 is composed of a rod 12 adopted to be fixed to the operating part for creating the push-pull forces, or to the controlled element into which the push-pull forces are to be transmitted. The rod 12 has one end thereof slidably and rotatably enclosed in the bore of one end of a tubular member 13 by which one end of the device may be adjustably affixed to a suitable support, such as an apertured frame provided with suitable means for securing such member 13 thereto. The other or inner end of the tubular member 13 is internally threaded and is secured onto the outer end of a cylindrical member 14, the inner end of which houses one extremity of the sheath 10.

The inner end of the sliding rod 12 enclosed by the tubular member 13 is provided with an end, longitudinally extending slot 15 which receives one end of the longitudinally reciprocable, flat, force transmitting member 16. The rod 12 is secured to the transmitting member 16 by a plurality of set screws 17. The transmitting member 16, it will be understood, extends throughout the length of the device and is secured at its other end to a similar sliding rod 12 at the other end of the device. The side faces of the transmitting member 16 are provided with centrally located, longitudinally extending grooves 18 with which are engaged two rows of bearing balls 19. The balls 19 in each row are maintained in given spaced alignment by means of a longitudinally extending cage 20. On both sides of the two lines or rows of balls 19, and in contact with them, are two flat guides or races 21 each also provided with a longitudinal groove 22 in which the balls run. It will be noted from FIGS. 2 and 3 of the drawings, that the ends of the ball cages 20 and the outer races 21 extend beyond the outer end of the cylindrical member 14 and into the inner end of the tubular member 13 beyond the threaded connection of such tubular member 13 with the cylindrical member 14.

The terminal ends of the ball cages 20 and the outer races 21 at each end of the device are enclosed by a pair of coaxial cylindrical members or tubes 26, 27, the inner tube 26 having an outside diameter slightly less than the inside diameter of the outer tube 27 so that it is readily slidable and rotatable within such outer tube. Each of the tubes 26, 27 is provided with two slots 28, 28' and 29, 29' respectively, the slots on each tube having a configuration and arrangement similar to the slots on the other tube. The slots on each tube are closed and spaced from the ends of the tube and are located directly opposite each other. Each of the slots in each tube extend along an approximately 45° spiral, with one slot spiralling in a left hand direction (28' or 29') and the other slot spirally in a right hand direction (slot 28 or 29) so that such slots are disposed in diverging relation from one end of the tube. The inner tube 26 is arranged within the outer tube 27, so that the slots 28, 28' of the former covers the slots 29', 29 respectively, of the latter to form two open square spaces 30 on opposite sides of the coaxial tubes. Extending through each of the open square spaces 30 is a follower 31 with a round shank which extends inwardly from the outer periphery of the outer tube 27, through the inner tube 26, and through an aperture in an outer race 21 to terminate in a low friction washer 33 located between such outer race and the transmitting member 16. The washers 33, 33 space the outer races 21 from the transmitting member 16 and due to this small outside diameter prevent the creation of friction such as is usually caused by the deflection of the transmitting member 16 when the device is bent or flexed.

The coaxial tubes 26, 27 are housed in the inner end of the tubular member 13, the bore of such member at each inner end thereof being enlarged to provide an internal shoulder 35, in FIG. 2, which restricts longitudinal movement of the coaxial tubes outwardly. Movement of the coaxial tubes inwardly is restricted by the terminal end of the cylindrical member 14. It will thus seem that the coaxial tubes 26, 27 are housed in the tubular member 13 against longitudinal movement therein, but are free to rotate relative to such member 13 and to each other. It will also be understood that as the tubes rotate relative to each other in one direction or the other, the open square spaces 30 formed by the slots thereof will move longitudinally of the coaxial tubes but in opposite directions for each such direction of rotational movement. The range of rotational movement of the tubes in one direction or the other will be limited by at least one of the followers 31 coming into engagement with one end of a slot in the tubes.

It will be noted from the foregoing description, that as a result of the construction of this invention, the ends of the outer races will be anchored exteriorly thereof thereby leaving the space between such outer races clear for the extension of the ball cages 20 into the anchor area of the control. With the extension of the ball cages into such area, it is possible to reduce the unsupported length of the transmitting member 16 to a substantial extent. Thus the unsupported length of the transmitting member can be lowered at mid-stroke to one quarter the stroke at each end. At the end of the stroke, only one half of the stroke at one end will remain unsupported. This condition will be further improved because of the attachment of the ends of the transmitting member in the slots 15 at the inner ends of the end rods 12. The combination of these structural features will keep the load column in line, thereby strengthening the transmitting member, lessening its possible deflection, and decreasing the back-lash and friction created in the use of the device. This construction also enables the use of a wider and/or thicker transmitting member thereby making it possible to substantially increase the load properties of this type of device.

It will also be understood that the above described construction enables the control to be bent in two directions. When the control is bent in either of such directions, the outer race 21 which will be on the outside of the curve of bend will recede thus forcing its associated follower 31 to be withdrawn and in doing so causing such follower to rotate the coaxial tubes in opposite directions. The other follower 31 will cooperate by traveling in the opposite direction and forcing the tubes to rotate in the same directions as under the force of said associated follower. These movements of the two followers will compensate for the differential lengths of the outer races caused by the bending operation. When the control is bent in the other, or opposite direction, the same operation will be performed but the movements of the outer races, the followers, and the coaxial tubes will be received. When the control reaches its operative position, the followers come to rest and any load that is applied through the outer races is equalized between the races because then they are both fixed while the transmitting member 16 is actuated in both tension and compression.

While I have hereinabove described and illustrated in the drawings, a preferred embodiment of my invention, it will be understood by those skilled in the art that various changes may be made therein without departing from the spirit of the invention or the scope of the appended claims.

I claim:

1. A flexible remote control device for transmitting traction or compression forces, comprising a flexible tubular sheath, a flat flexible force transmitting member adapted to move to and fro in said sheath, a pair of flexible flat elongated guide members arranged in said sheath on opposite sides of said transmitting member, spaced rolling elements between said guide members and said transmitting member, a pair of coaxial tubes located at at least one end of said device and rotatable relative to each other, means rotatably supporting said pair of coaxial tubes in said device and limiting axial movement therein in at least one direction, each of said coaxial tubes in said pair thereof being provided with a pair of oppositely disposed closed slots extending generally in inclined relation lengthwise of the tube, each slot on one of said coaxial tubes being associated with a slot on the other coaxial tube and said associated slots in each pair thereof being inclined in opposite directions so that such associated slots in each pair thereof cross to form at their juncture a space through both of said tubes, the inclinations of the associated slots in each pair thereof being such that the space formed by one pair of associated slots is movable lengthwise of the device in directions opposite to the movements of the space formed by the other pair of associated slots as said tubes are rotated relative to each other, and a follower in each of said spaces and connected to one of said guide members.

2. A flexible remote control device as defined in claim 1 in which the associated end of said transmitting member extends through said tubular means, an aligned operating rod at said one end of said device having an inner slotted end for receiving said associated end of said transmitting member in axially aligned relation, and means fixedly securing said transmitting member end to said slotted end of said operating rod.

3. A flexible remote control device as defined in claim 1, in which the associated ends of said guide members extend into the interiors of said pair of coaxial tubes.

4. A flexible remote control device as defined in claim 1, including elongated means extending between said guide members and said transmitting member for maintaining said spaced rolling elements in given spaced longitudinal relation, the unit formed by said elongated means and said spaced rolling elements extending at its outer end into the interiors of said pair of coaxial tubes.

5. A flexible remote control device as defined in claim 1, in which the associated slots of said coaxial tubes in each pair of such associated slots, spiral in opposite directions.

6. A flexible remote control device for transmitting traction or compression forces, comprising a flexible tubular sheath, a flat flexible force transmitting member adapted to move to and fro in said sheath, a pair of flexible flat elongated guide members arranged in said sheath on opposite sides of said transmitting member, spaced rolling elements between said guide members and said transmitting member, and means at one end of said device for anchoring the adjacent ends of said guide members, said anchoring means comprising tubular means encircling such adjacent ends of said guide members and said transmitting member and extending lengthwise of the same, means in said device supporting said tubular means for rotatable movement about the longitudinal axis thereof and limiting axial movement thereof in said device in at least one direction, said tubular means being provided with cam means operative to cause rotational movement thereof, and such adjacent end of at least one of said guide members being longitudinally movable relative to said tubular means on flexure of said device, a pair of separate members disposed on opposite sides of said transmitting member and each being connected to such adjacent end of one of said guide members, at least one of said separate members being provided with cam means engaging the cam means of said tubular means and operative through the latter to rotate said tubular means during the longitudinal movements of such movable adjacent end of said one guide member because of a flexure of said device.

7. A flexible remote control device as defined in claim 6, including spacer means located between each such adjacent end of said guide members and said transmitting member.

8. A flexible remote control device as defined in claim 6, in which said adjacent ends of said guide members are longitudinally movable in opposite directions relative to said tubular means on flexure of said device in either one of two opposite directions, and in which both of said separate members are provided with cam means, the cam means of both separate members engaging the cam means of said tubular means to rotate the latter during the longitudinal movements of such adjacent ends of said guide members.

References Cited by the Examiner

UNITED STATES PATENTS

| | | | |
|---|---|---|---|
| 1,231,055 | 6/1917 | Packard | 74—489 |
| 2,442,360 | 6/1948 | Herkert | 74—501 |
| 2,841,029 | 7/1958 | Richoux | 74—501 |
| 3,128,637 | 4/1964 | Richoux | 74—501 |
| 3,135,132 | 6/1964 | Bratz | 74—501 |

FRED C. MATTERN, JR., *Primary Examiner.*

HALL C. COE, *Examiner.*